Dec. 3, 1940.   S. J. HARLEY ET AL   2,223,888
CIRCULAR INDEXING MECHANISM
Filed July 17, 1939   5 Sheets-Sheet 2
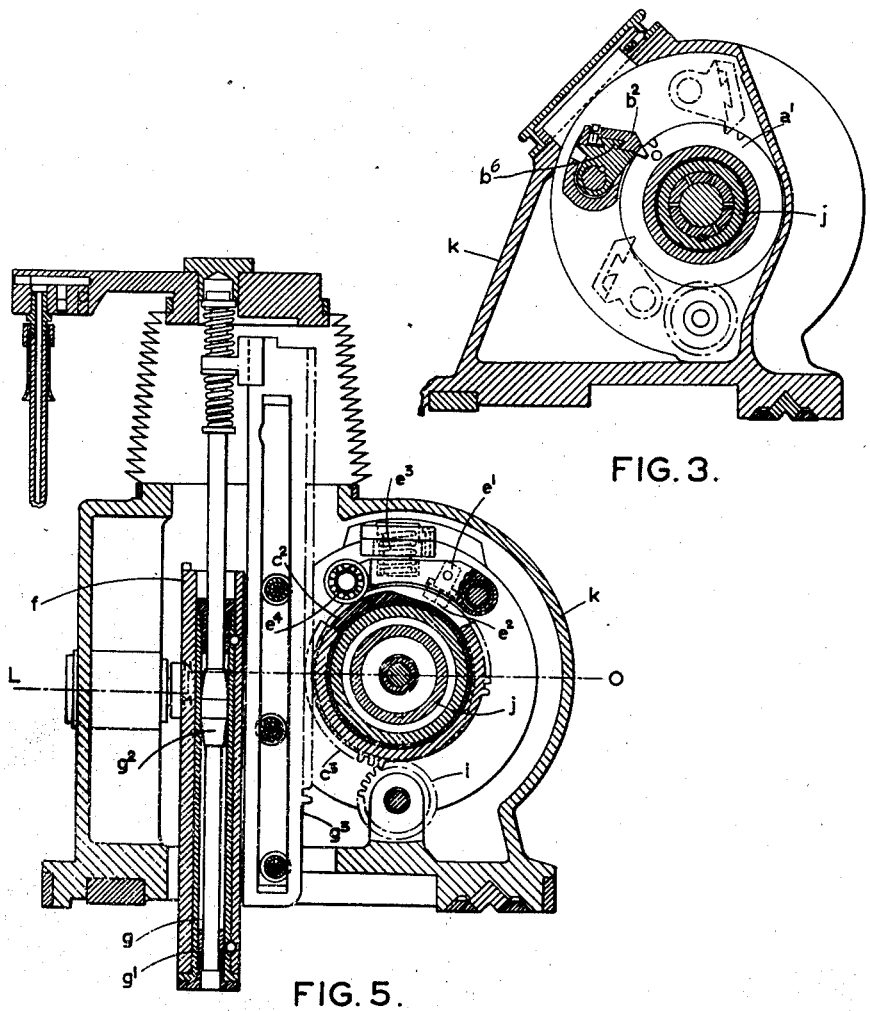
FIG. 3.
FIG. 5.
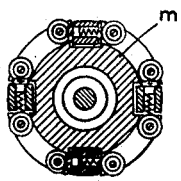
FIG. 2.
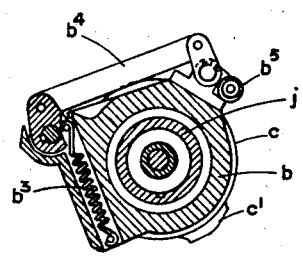
FIG. 4.

Dec. 3, 1940.  S. J. HARLEY ET AL  2,223,888
CIRCULAR INDEXING MECHANISM
Filed July 17, 1939  5 Sheets-Sheet 4

Inventors:
Stanley J. Harley
George Celah
by Richard E. Babcock
Attorney

Patented Dec. 3, 1940

2,223,888

UNITED STATES PATENT OFFICE 2,223,888

CIRCULAR INDEXING MECHANISM

Stanley Jaffa Harley, Coventry, and George Olah, Birmingham, England

Application July 17, 1939, Serial No. 285,015
In Great Britain April 5, 1938

7 Claims. (Cl. 51—216)

The object of the present invention is to provide an automatically operated circular indexing mechanism for use in connection with machining operations, and more particularly where, as in machines for operating on or generating helical or spiral surfaces, it is necessary to give the work-piece an angular motion additional to the indexing movement.

The improved mechanism is especially suitable for use on or in connection with machines for grinding gears, helical flutes and splines and for similar purposes.

According to the invention circular indexing mechanism for the purposes described comprises in combination an index plate carrier, an index carrier, a clutch member, means for giving the latter a variable oscillatory motion, a second clutch member operatively associated with the index plate carrier, a cam and means for oscillating the cam for engaging and disengaging alternately the index and/or the clutch members.

In the accompanying drawings:

Figure 2 is a cross-sectional view on the line A—A of Figure 1.

Figure 3 is a cross-sectional view on the line B—B of Figure 1.

Figure 4 is a cross-sectional view on the line C—C of Figure 1.

Figure 5 is a cross-sectional view on the line D—D of Figure 1.

Throughout the drawings like parts are designated by similar reference characters.

Figure 1:
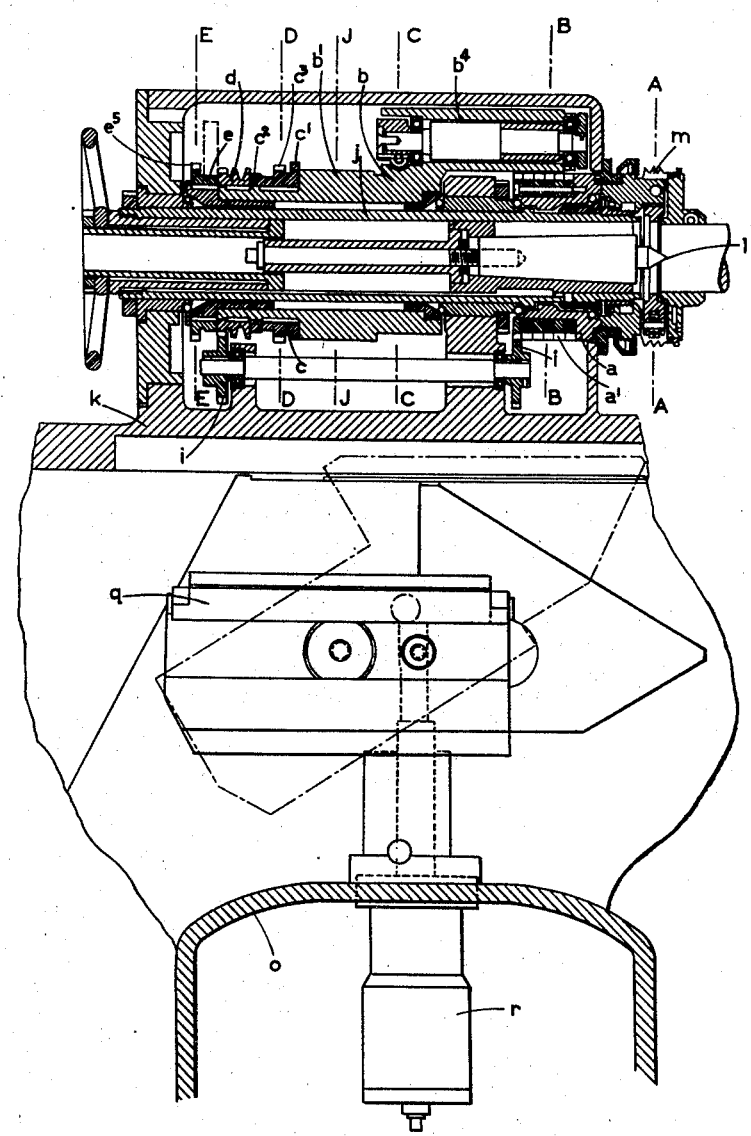
Figure 1 is a longitudinal sectional view of the improved circular indexing mechanism.

Referring to the drawings, $a$ represents the index plate carrier, $b$ the index carrier, $c$ the cam member and $d$, $e$ the clutch members. $f$ is a transverse member for imparting an additional motion to the mechanism, $g$ is a hydraulically operated member for engaging and disengaging the index, $h$ is a similar member for indexing purposes, $i$ is a gear connection between the index plate carrier $a$ and the member $d$ of the clutch. $j$ is a sleeve around which the elements $a$, $b$, $c$, $d$, and $e$ can be rotated. $k$ is a housing in which the sleeve $j$ is mounted and in which the transverse member $f$ can be moved at right angles to the axis of said sleeve $j$. $l$ is a workholding centre and $m$ a coupling between the work-piece and the index plate carrier $a$.

A cylindrical drum $b^1$ forming part of the index carrier $b$ is connected with the transverse member $f$ by steel tapes $f^1$. This connection operates in a similar manner to a rack and pinion which may, if desired, be substituted for the drum and tapes. As will be understood, any rectilinear motion of the transverse member $f$ at right angles to the axis of the drum $b$ will cause a proportional angular motion to be imparted to the index carrier $b$ and, if the index $b^2$, Figure 3, is in engagement with one of the index plates $a^1$, will also cause a similar motion to be imparted to the index plate carrier $a$ and to the work-piece connected therewith by the coupling $m$. By moving member $f$ an angular motion can, therefore, be imparted to the work-piece additional to and independent of the indexing motion. The mechanism for indexing is operated by the following means,— A spring $b^3$, Figure 4, normally tends to bring the index $b^2$, Figure 3, into engagement with one of the index plates $a^1$. The said index $b^2$ is connected by the intermediate member $b^4$ with the roll $b^5$ which is arranged for engagement by the profile $c^1$ of cam $c$. In the working position shown, the index $b^2$ is engaged with one of the index plates $a^1$ but will be disengaged therefrom when the cam profile $c^1$ contacts with the roll $b^5$.

The member $e$ of the clutch carries a lever $e^1$, having a contact piece $e^2$, Figure 5. A spring $e^3$ tends to cause the lever $e^1$ to press the contact piece $e^2$ into a V-slot in the other clutch member $d$. In the position shown, however, contact between the contact piece $e^2$ and the clutch member $d$ is prevented by a second cam profile $c^2$ on the cam member $c$ engaging a roll $e^4$ on the lever $e^1$.

The clutch member $d$ is connected by gearing $i$, Figure 1, with the index plate carrier $a$. Any angular motion, therefore, of the clutch member $d$ relative to the index carrier $b$ causes an equal angular motion of the index plate carrier $a$ and of the work-piece.

The hydraulically operated member $g$, Figure 5, consists of a hydraulic cylinder $g^1$ mounted in the transverse member $f$ a piston or plunger $g^2$ and a rack $g^3$ connected with the piston rod. The rack $g^3$ engages with a gear member $c^3$ which forms part of the cam member $c$.

Figure 7:
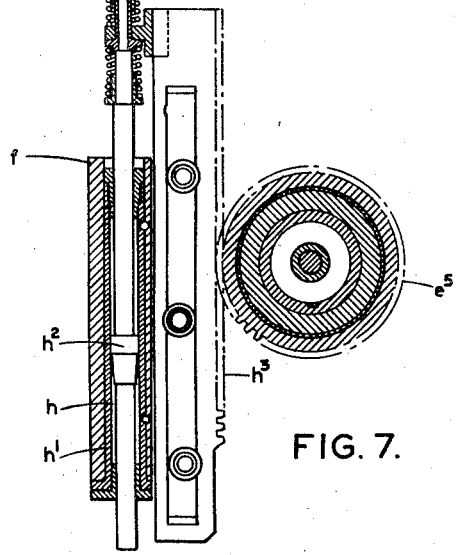
Figure 7 is a cross-sectional view on the line E—E of Figure 1.

The hydraulically operated member $h$, Figure 7, comprises a hydraulic cylinder $h^1$ mounted in the transverse member $f$, a piston or plunger $h^2$, and a rack $h^3$ which is connected with the piston rod and engages a gear member $e^5$ forming a part of the clutch member $e$.

The stroke of piston $g^2$ is constant. The downward stroke of piston $h^2$ has also a constant limitation. The upward stroke of piston $h^2$ is limited by a stop $h^4$ which can be adjusted by the micrometer screw $h^5$.

The racks $g^3$ and $h^3$ may, however, be operated in any other suitable manner and their movements are independent of and relative to the movement hereinafter described of the transverse member $f$.

The indexing process comprises the following phases—

1. Downward stroke of piston $g^2$. Oil is admitted to the upper part of cylinder $g^1$ by a hydraulic control mechanism which forms no part of the present invention. Piston $g^2$ and rack $g^3$ make a downward stroke and the gear member $c^3$ is given an anticlockwise angular motion of a fixed amount. In the starting position the roll $e^4$ is in contact with the cam $c^2$, Figure 5, and by means of the lever $e^1$ keeps the contact piece $e^2$ out of contact with the V-slot in the clutch member $d$. After a given angular motion of the cam member $c$ the cam profile $c^2$ leaves the roll $e^4$ free and allows the spring $e^3$ to move the lever $e^1$ to bring the contact piece $e^2$ into engagement with the V-slot in the clutch member $d$. Contact piece $e^2$ and the V-slot function as a frictional clutch connecting the members $e$ and $d$.

In the further progress of the angular motion of cam member $c$, the cam $c^1$ engages roll $b^5$ and causes the index $b^2$ to be disengaged from the index plate $a^1$, Figure 3. At the end of this phase of the indexing process, the angular position of the work is not determined, therefore, by the position of the index carrier $b^1$ but by the position of the member $e^1$ by reason of the connection $e$, $d$, $i$, $a$, $m$ and work-piece.

2. Downward stroke of piston $h^2$. Oil is admitted to the upper part of the hydraulic cylinder $h^1$ thus causing a downward stroke of piston $h^2$, and rack $h^3$ and a corresponding angular motion of the clutch member $e$ and of the connected work-piece. The amount of this angular motion of $e$ depends upon the length of stroke of piston $h^1$ which can be adjusted by means of the micrometer screw $h^5$ in accordance with the required angular division.

3. Upward stroke of piston $g^2$. Oil is admitted to the lower part of cylinder $g^1$, causing piston $g^2$ to make its return stroke and to rotate gear member $c^3$ in a clockwise direction, Figure 5. This takes the cam profile $c^1$ away from roll $b^5$ and leaves the index $b^2$ free to engage the index plate under the influence of spring $b^3$, Figure 4. In the further progress of the angular motion of the cam member $c$, the cam profile $c^2$ thereof raises roll $e^4$, Figure 5, and thus disengages the frictional connection between the clutch members $e$ and $d$. At the end of this phase the position of the workpiece is again determined by the position of the index.

4. Upward movement of piston $h^2$. Oil is admitted to the lower part of cylinder $h^1$ causing the piston $h^2$ to make its return stroke and to return clutch member $e$ to its original position relative to the index carrier $b$. As in this phase there is no connection between clutch member $e$ and the index plate carrier $a$, the position of the work-piece is not influenced.

It will be observed that the performance of the indexing process depends only upon the relative positions of the members $a$, $b$, $c$, $d$, and $e$ which are determined by the relative positions of the members $f$, $g$, and $h$. Since a motion of $f$ causing an additional angular motion of the work-piece does not influence these relative positions, the indexing process is independent of the additional motion and in fact any motion can be added to the indexing motion without influencing the latter.

In the indexing process above described the work-piece is rotated in an anti-clockwise direction. In order to reverse this the sequence of the single phases must be altered as follows—

1. Downward stroke of piston $g^2$.
2. Upward stroke of piston $h^2$.
3. Upward stroke of piston $g^2$.
4. Downward stroke of piston $h^2$.

The additional motion which can be imparted to the work-piece by moving the transverse member $f$ can be utilized for a variety of different purposes, as for example, the generation of spiral flutes and a fine angular setting of the work-piece by hand.

Figure 8:
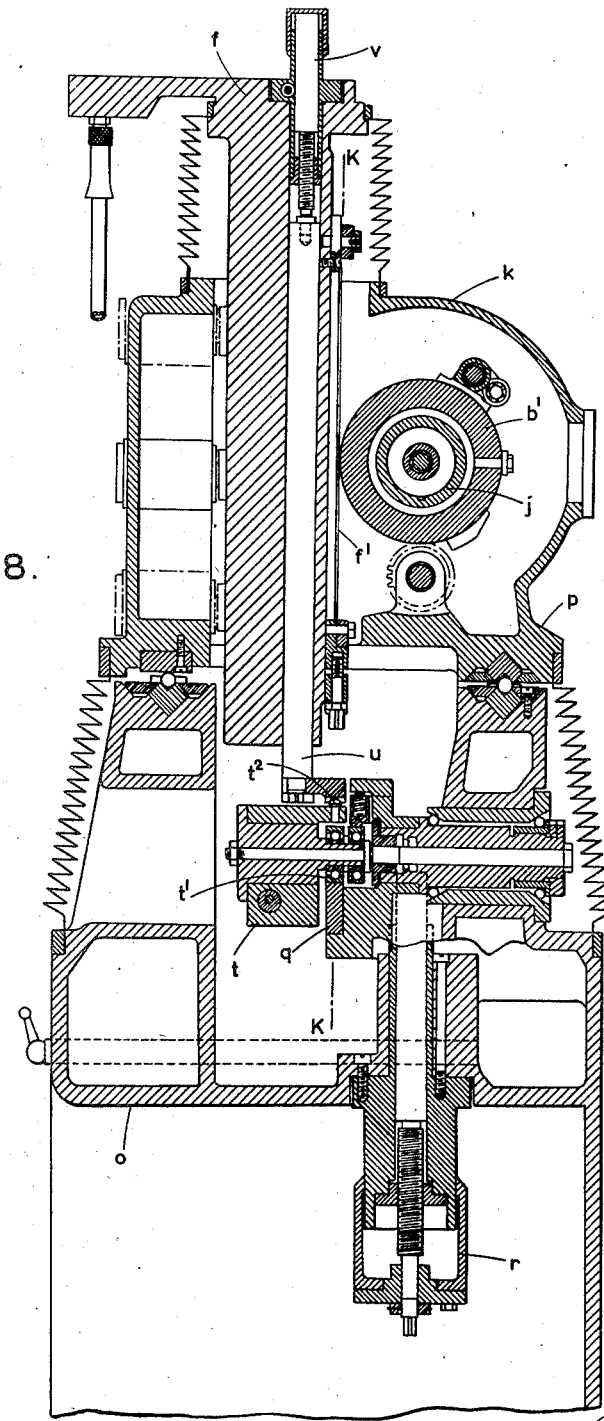
Figure 8 is a cross-sectional view on the line J—J of Figure 1.

The spiral generating mechanism includes the machine bed $o$, a table $p$ sliding thereon and carrying the indexing mechanism above described, a sine bar $q$, a micrometer screw $r$ for adjusting the angular position of the sine bar, Figure 8, a bracket $s$ integral with the table $p$, a slide $t$ vertically movable thereon and carrying a roll $t^1$ contacting with the sine bar $q$, a rod $u$ and a micrometer screw for adjusting the latter.

The micrometer screw $r$ for the angular setting of the sine bar could be replaced by any other mechanical or optical means.

Figure 9:
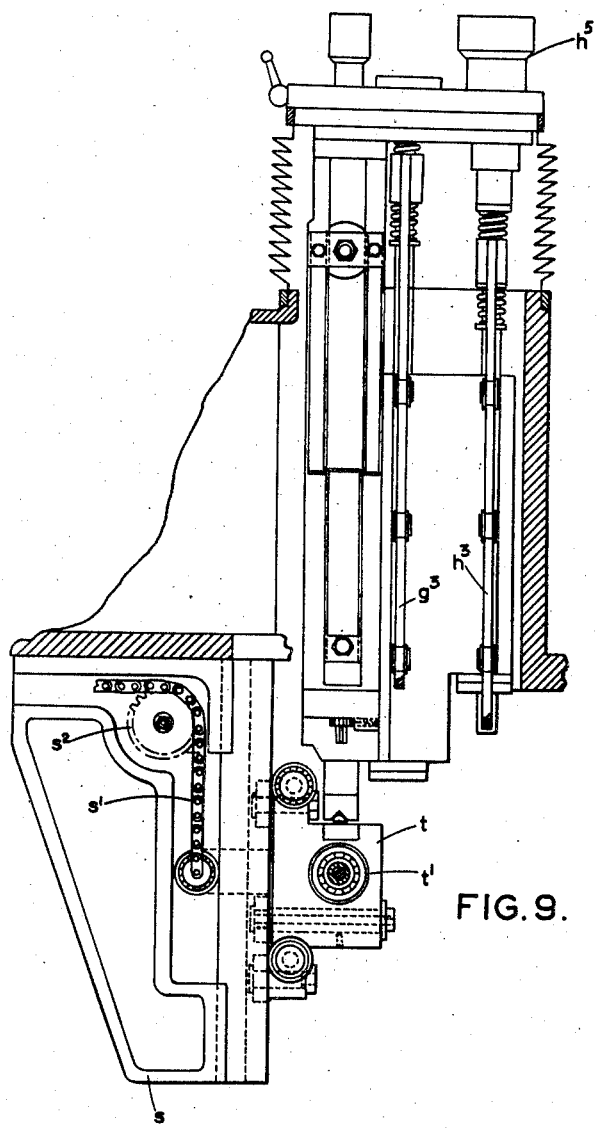
Figure 9 is a sectional view on the line K—K of Figure 8.

Movement of the table $p$ horizontally along the machine bed $o$ causes the roll $t^1$ engaging the straight edge of the sine bar $q$ to move the slide $t$ vertically on the bracket $s$ proportional to the horizontal motion of the table $p$. The said slide $t$ may be counterbalanced by a weight (not shown) attached to the free end of a chain $s^1$ the other end of which passes over a sprocket $s^2$ on the bracket and is attached to the slide $t$, Figure 9.

The lower extension or rod $u$ contacts with a stop $t^2$ on slide $t$. The top of the rod is pressed against the micrometer screw $v$ mounted in the member $f$. A vertical motion of the slide $t$ will, therefore, cause an equal vertical movement of the member $f$ and a corresponding angular motion of the work-piece will take place by the operation of the steel tapes and the drum $b^1$, which forms part of the index carrier $b$.

The amount of angular motion corresponding with a given amount of horizontal table motion which defines the lead of the spiral depends on the angular setting of the sine bar $q$ by means of the micrometer screw $r$.

By adjusting the micrometer screw $v$ a further component motion can be added to the spiral generating vertical motion of the transverse member $f$ which additional component can be used to give a fine angular setting of the work-piece.

Figure 6:
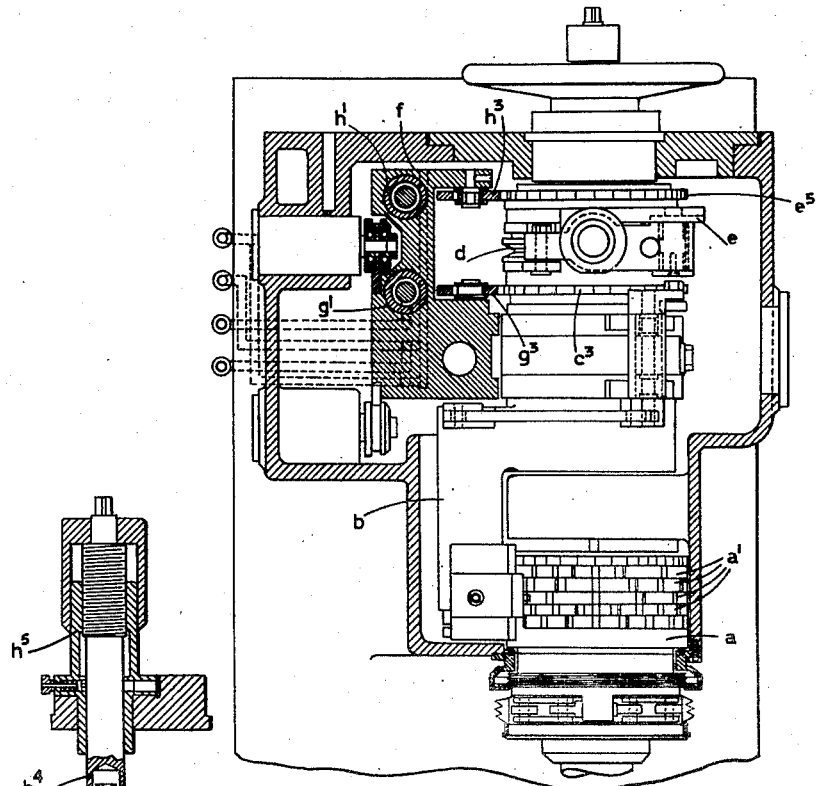
Figure 6 is a horizontal sectional view on the line L—M—N—O of Figure 5.

For convenience of operation the index plate carrier $a$ may, as shown in Figures 1 and 6, be provided with a plurality of different index plates $a^1$ and the index $b^2$ may be arranged for adjustment on a guide $b^6$ along an axis parallel with that of the said carrier so that any desired index plate can be selected at will.

The coupling $m$ may be of any suitable type such as that shown in transverse section in Figure 2. The work-piece may either be supported by a fixed centre or by a rotatable centre carrying the index plate $a^1$ and mounted in the housing $k$ instead of the sleeve $j$.

We claim:

1. Work holding and advancing mechanism comprising a machine bed, a table mounted for horizontal sliding movement on said machine bed, indexing mechanism carried by said table comprising an index carrier mounted for rotation in said table and formed with a cylindrical drum portion, and a pair of gear toothed members mounted on said index carrier for oscillation relative thereto, in combination with a slide carried by said table and disposed for vertical sliding movement therein, a pair of hydraulically operated racks carried by said slide in mesh with said respective gear toothed members and disposed for vertical reciprocation relative to said slide, a pair of vertically disposed tapes carried by said slide and connected to the drum portion of said index carrier, and means for producing vertical movement of said slide during horizontal movement of the table in which said slide is carried in order to produce simultaneous equal rotation of said index carrier and the said gear toothed members mounted for oscillation thereon, said means comprising an adjustably inclined sine bar carried by the machine bed and disposed in the directions of movement of said table, a freely vertically movable member carried by said table beneath said slide, a roll carried by said member in engagement with said sine bar to cause vertical movement of said member proportional to the horizontal movement of said table, and a depending rod carried by said slide with its lower end resting on said member, whereby vertical movement of said member produces a simultaneous equal amount of vertical movement of said slide.

2. Work holding and advancing mechanism comprising a machine bed, a table mounted for horizontal sliding movement on said machine bed, indexing mechanism carried by said table comprising an index carrier mounted for rotation in said table and formed with a cylindrical drum portion, and a pair of gear toothed members mounted on said index carrier for oscillation relative thereto, in combination with a slide carried by said table and disposed for vertical sliding movement therein, a pair of hydraulically operated racks carried by said slide in mesh with said respective gear toothed members and disposed for vertical reciprocation relative to said slide to cause oscillation of said respective gear toothed members, a pair of vertically disposed tapes carried by said slide and connected to the drum portion of said index carrier, and means for producing vertical movement of said slide and the racks carried thereby during horizontal movement of the table in which said slide is carried in order to produce simultaneous equal rotation of said index carrier and said gear toothed members mounted thereon, said means comprising an adjustably inclined sine bar carried by the machine bed and disposed in the direction of movement of said table, a freely vertically movable member carried by said table in engagement with said sine bar during horizontal movement of said table whereby horizontal movement of said table produces a proportional amount of vertical movement of said member, and a depending rod carried by said slide with its lower end resting on said vertically movable member.

3. Work holding and advancing mechanism comprising a machine bed, a table mounted for horizontal sliding movement on said machine bed, indexing mechanism carried by said table comprising an index carrier mounted for rotation therein and formed with a cylindrical drum portion, and a clutch member and a cam respectively mounted for oscillation on said index carrier, in combination with a slide carried by said table and disposed for vertical sliding movement relative to said table, vertically reciprocating members carried by said slide in operative engagement with said clutch member and said cam respectively, means for producing out of phase reciprocation of said members relative to each other to cause relative oscillation of said clutch member and said cam about the index carrier, a vertically disposed tape carried by said slide and connected to the drum portion of the index carrier, and means for producing vertical movement of said slide and the reciprocating members carried thereby during horizontal movement of the table in which said slide is carried in order to produce simultaneous equal rotation of the index carrier and the clutch member and the cam mounted thereon.

4. Work holding and advancing mechanism comprising a machine bed, a table mounted for sliding movement on said machine bed, indexing mechanism carried by said table comprising an index carrier rotatably mounted therein, and a clutch member and a cam respectively mounted on said index carrier for oscillation relative thereto, in combination with a slide carried by said table and disposed for movement transverse to the rotational axis of the index carrier, members carried by said slide in operative engagement with said clutch member and said cam respectively and disposed for reciprocation relative to said slide, means for producing reciprocation of said members to cause oscillation of said clutch member and said cam relative to said index carrier and to each other, means carried by said slide in engagement with said index carrier to cause rotation of the same during movement of said slide, and means for producing movement of said slide during movement of said table.

5. Work holding and advancing mechanism comprising a machine bed, a table mounted for horizontal sliding movement relative to said bed, indexing mechanism carried by said table comprising a rotatably mounted index carrier, and a relatively oscillatable member coaxially mounted on said carrier, in combination with a vertically movable slide carried by said table, means for vertically moving said slide, means carried by said slide in engagement with said oscillatable member for producing oscillation thereof independent of the vertical movement of said slide, and means carried by said slide for causing simultaneous rotation of said index carrier and said oscillatable member during vertical movement of said slide.

6. Work holding and advancing mechanism comprising a freely rotatably mounted index plate, an index carrier mounted for rotation independently of said plate, an index carried by said index carrier and movable into and out of engagement with said index plate, a driven clutch member journalled coaxially on said index carrier for rotation relative thereto, a gear connection between said driven clutch member and said index plate for causing simultaneous rotation of said plate with said clutch member, an oscillating driving clutch member journalled coaxially on said index carrier for oscillation relative thereto, cam operated engaging means carried by said driving clutch member for engaging and partially rotating said driven clutch member in one direction of oscillation of said driving clutch member, a cam journalled coaxially for oscillation on said index carrier to during oscillation in one direction cause driving engagement between said engaging means and said driven clutch member and to move said index out of engagement with said index plate to permit simultaneous partial rotation of said plate with said driven clutch member, and to during oscillation in the reverse direction cause disengagement between said engaging means and said driven clutch member and to move said index into engagement with said index plate, and means for causing oscillation of said cam and said driving clutch member.

7. Work holding and advancing mechanism comprising a rotatably mounted index plate, an index carrier disposed for rotation adjacent said plate, and a releasable index normally operatively connecting said index carrier and plate for simultaneous rotation, in combination with a slide disposed for bodily movement relative to said index carrier, index carrier rotating means carried by said slide in engagement with said index carrier for producing rotation thereof during movement of said slide, actuating means relatively movably mounted on said slide, mechanism operatively connecting said actuating means to said index to cause disengagement of said index from said plate during movement of said actuating means relative to said slide, additional actuating means relatively movably mounted on said slide, and mechanism operatively connecting said additional actuating means to said index plate to produce rotation of said plate during movement of said additional actuating means relative to said slide after the index has been disengaged from the index plate by said first mentioned actuating means.

STANLEY JAFFA HARLEY.
GEORGE OLAH.